US005615331A

United States Patent [19]
Toorians et al.

[11] Patent Number: 5,615,331
[45] Date of Patent: Mar. 25, 1997

[54] SYSTEM AND METHOD FOR DEBUGGING A COMPUTING SYSTEM

[75] Inventors: Arman Toorians, Santa Clara; Elizabeth Q. Liu, San Jose, both of Calif.

[73] Assignee: Phoenix Technologies Ltd., Santa Clara, Calif.

[21] Appl. No.: 265,376

[22] Filed: Jun. 23, 1994

[51] Int. Cl.$^6$ ................................ G06F 9/44
[52] U.S. Cl. ........................... 395/182.07
[58] Field of Search ................ 395/700, 500, 395/182.07, 183.04; 364/282.2, 280, 280.9, 262.4; 371/16.2, 19

[56] References Cited

U.S. PATENT DOCUMENTS

| 4,674,089 | 6/1987 | Poret et al. | 371/25 |
|---|---|---|---|
| 5,053,949 | 10/1991 | Allison et al. | 364/200 |
| 5,109,521 | 4/1992 | Culley | 395/800 |
| 5,119,377 | 6/1992 | Cobb et al. | 371/19 |
| 5,206,948 | 4/1993 | DeAngelis et al. | 395/575 |
| 5,228,039 | 7/1993 | Knoke et al. | 371/19 |

Primary Examiner—Vincent P. Canney
Attorney, Agent, or Firm—Philip T. Virga

[57] ABSTRACT

A system and method for debugging a development computing system is disclosed. The BIOS in the development system includes a debug engine. Interrupt-handling macros in BIOS include an entry macro to direct debug output codes (e.g., port 80 and beep codes) to the debug engine. A near entry macro is added to BIOS-segment macros (e.g., F000 segment) which provides the offset of the debug engine. A far entry macro is added to non-BIOS-segment macros which provides the segment and offset of the debug engine. The debug engine sends the output codes to a remote host computer via a communication channel (e.g., a bi-directional parallel port) on the development system. The debug engine also saves the contents of various registers on the development system to the host computer. Thus, the invention can be used in a stackless environment. Debug commands (e.g., memory dump, set break address) can be issued from the host computer to the development system via the communications channel. Such commands are executed on the development system in accordance with program instructions in the debug engine. Debug data associated with the development system may be sent to the host computer via the communications channel in response to a debug command (e.g., memory dump data). Thus, a user can interactively and remotely debug the development system.

34 Claims, 4 Drawing Sheets

SYSTEM AND METHOD FOR DEBUGGING A COMPUTING SYSTEM

BACKGROUND OF THE INVENTION

1. Field of the Invention

This invention relates to debugging computer systems, and more particularly to a debugging engine that is resident in the hardware/software interface segment of memory on a development computing system and communicates debugging information to a remote host computer via a parallel port on the development system.

2. Background Art

BIOS Background

The architecture of most computers is generally defined by functional layers. The lowest layer is the hardware-the actual machine. The highest layer is the application program that interfaces with a user. In between the hardware and application program is the system software. The system software itself may be composed of several elements, including: the operating system kernel and shell, device drivers, and, perhaps, a multitasking supervisor.

Most architectures also include a low-level software layer between the hardware and the system software, called BIOS—Basic Input/Output System. The BIOS insulates the system and application software from the hardware by providing primitive I/O services and by handling interrupts issued by the computing system. Most computing systems are mainly controlled through the use of interrupts. Interrupts can be generated by the microprocessor, by the system hardware, or by software. The BIOS provides a logical handling of the interrupt signals. When an interrupt occurs, control of the computer is transferred to an interrupt vector which defines the "segment:offset" address of the routing in BIOS assigned to the given interrupt number.

BIOS Interrupt Service Routines (ISRs) handle interrupts issued by hardware devices. ISRs use registers in the microprocessor and BIOS data areas. The BIOS Device Service Routines (DSRs) handle software interrupts issued by the INT instruction.

The BIOS generally uses three data areas in RAM, including the Interrupt Vector Table, the BIOS Data Area, and the Extended BIOS Data Area (e.g., for power management). The BIOS also uses various input/output (I/O) ports.

BIOS Debugging

Debugging a computer system at the BIOS level is conventionally done with an in-circuit emulator (ICE). An ICE physically replaces the CPU in the development or target machine. The ICE is connected to the development machine through one buffer and with the host computer through another buffer. BIOS commands are received by the ICE through the buffers and processed by RAM resident in the ICE. The development computer BIOS accesses the ICE RAM exactly as if it was on the development machine. Attempts have been made to make ICE machines faster in order to handle debugging processing requirements. See for example, U.S. Pat. No. 4,674,089 (Poret, et al.) that discloses an improved very large scale integrated ICE that attaches to the motherboard.

ICE technology has many severe limitations. For example, ICE software is platform or CPU-specific and very expensive (around $50,000 per platform). An ICE tester is large and requires physical setup (removal of target CPU). This also necessitates a socket on the target machine for hookup. In addition, system specific ICE software may not be available when a new chip enters the market, thus ICE testing of development systems using the new chip are not possible.

Some modifications to minimize the amount of external circuitry required have been made in various debug peripherals or daughter boards. See, for example, U.S. Pat. No. 5,053,949 (Allison et al.) or U.S. Pat. No. 5,047,926 (Kuo, et at.). However, these systems still required a physical connection to the development machine CPU memory space, e.g., via CPU TAP, an internal CPU data bus connection, or ROM (read only memory) socket, and also require peripheral buffers.

Software debugging programs, such as Soft-ICE, allow for analysis of application-issued BIOS commands. However, these systems assume fully functional hardware, microprocessor, memory, stack, BIOS, and operating system on the development machine. Only BIOS commands to/from the application program are analyzed.

Limitations of the prior art reveal the need for a BIOS-level real-time debugger that is resident on the development system and does not require external circuitry for the debugging interface. It would also be desirable to have a low-cost, easily installed and accessible, low-level debugger capable of communicating debugging information to a remote host computer. Furthermore, it would be desirable to have such a system on a development machine that may not have RAM, a stack, a booted operating system, power management, or otherwise be fully functional.

SUMMARY OF THE INVENTION

A debug engine is resident in the BIOS segment of memory in a development system. Interrupt-handling macros direct debug codes issuing from the development system to the debug engine. The debug engine sends the codes to a remote host computer via a communication channel (e.g., a bi-directional parallel port) on the development system. The contents of various registers on the development system are saved on the host computer and later restored to the development system. Thus, the present invention can be used in a stackless environment. Debug commands can be issued from the host computer to the development system via the communications channel. Such commands are processed in accordance with program instructions in the debug engine. Data associated with the development system (e.g., memory dump) may be sent to the host computer via the communications channel in response to a debug command.

In one embodiment, BIOS-level macros (e.g., in segment F000) comprise a near entry macro that provides the offset of the debug engine in the BIOS. Non-BIOS-level macros comprise a far entry macro that provides the segment and offset of the debug engine. Debug codes are passed to the entry macros as parameters or by using a memory register (e.g., the AL memory register).

DESCRIPTION OF THE PREFERRED EMBODIMENTS

Figure 1:
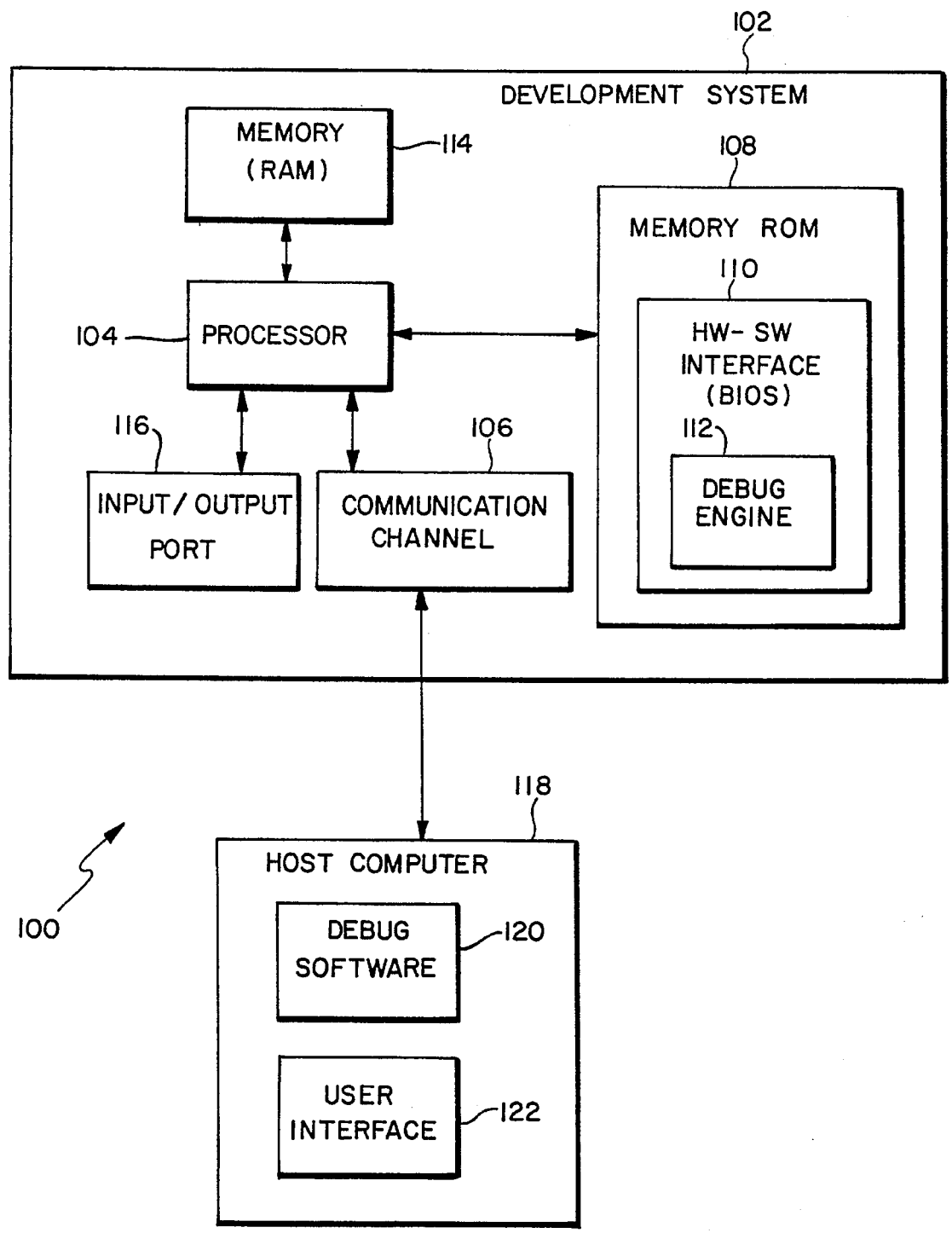
FIG. 1 is a simplified block diagram of the debugging invention.

FIG. 1 shows a block diagram of software and hardware tools for implementing one embodiment of the present debugging invention 100. Debugging generally refers to, for example, error, fault, interrupt, or operation signal detection and/or monitoring, and/or the handling, diagnosing, or analyzing such information. Target or development system 102 is a computing system under development and is the subject of the debugging effort. Development system 102 may be a computer, a computer board, or other computing system or subsystem, and may comprise a processor 104, communications channel 106, and memory 108. Processor 104 may be a central processing unit (CPU) (e.g., Intel 80386, 80486, Pentium; Motorola 68020, 68030, RISC processor, SPARC processors and the like) or similar computer processing elements. Communications channel 106 is communicatively coupled to processor 104. Communications channel 106 may be a conventional communication port such as a bi-directional parallel or a serial port. Memory 108 is coupled to processor 104. Memory 108 may be conventional computer memory such ROM or RAM storage. In a preferred embodiment memory 108 is read only memory (ROM). Memory (or portions of memory) 108 may be fabricated into a silicon chip (e.g., a ROM chip).

Memory 108 comprises a low-level software system, interrupt-handling, or basic input/output system (BIOS), module, or portion 110 that communicates between hardware and software elements of development system 102. According to the present invention, BIOS 110 comprises debug module, program, means, or engine 112. As described in detail below, debug engine 112 facilitates the debugging of development system 102 by sending debug codes issued by development system 102 to host computer 118. Host computer 118 sends debug commands 120 to debug engine 112, which responds with appropriate action and/or sends debug data to host computer 118.

Development system 102 may also comprise additional memory or random access memory (RAM) 114 coupled to processor 104. Memory 114 may be conventional computer memory such as that provided by RAM on a computer chip, a RAM disk, and the like. Development system 102 may also comprise various other communications and/or input/output (I/O) ports 116. Port 116 may include a port for displaying debug codes (sometimes called "port 80" as is conventionally known in the art).

Development system 102 is communicatively coupled to host computer 118. Communication may be between a port 106 in development system 102 and a port in host computer 118 (not shown) with a conventional cable. Alternate modes of communication, such as fiber optic or infrared communications are also possible. In one embodiment, a bi-directional parallel port in host computer 118 is connected to a bi-directional parallel port 106 in development system 102 via a conventional DB 25 (25 pin) 8 channel straight through male to male parallel cable with the following modifications:

Pin 1 of side A connected to pin 11 of side B;

Pin 11 of side A connected to pin 1 of side B;

Pin 13 of side A connected to pin 14 of side B;

Pin 14 of side A connected to pin 13 of side B;

Pin 17 disconnected. Alternatively, a serial port in the host computer 118 is connected to a serial port 106 in the development system 102 via a conventional DB25/3 channel cable.

Host system, platform, or computer 118 may be any conventional computing system such as an IBM PC or compatible, a Macintosh, DEC, Sun or Hewlett-Packard workstation, and the like. Host computer 118 generally comprises a processor, monitor, keyboard, and/or mouse (not shown) for data input/output from/to a user. In the present invention, host computer 118 comprises debug software 120 and optionally user interface 122.

Debug software 120 provides conventional debugging tools and commands. Debug software 120 may depend on development system 102 being debugged and BIOS 110 running on development system 102. Typical command capabilities provided by debug software may comprise: memory dump, move memory data, modify memory content, trace, break address, replace debug code, exit process, go execute process, go to next debug code and stop, interrupt set, break address replace, disable break address (e.g., DR0 for Intel products), disassembly of the next instruction, initialize parallel port, dump registers, dump output of debug session to file, symbolic debugging, help, and the like. See, for example, the commands set forth in Appendix A which is attached thereto to form a part hereof.

User interface 122 provides, for example, display capability of data returned from development system 102, debug command entry, and other conventional user interface utilities such as windowing, text display, and graphics. This utility 122 may also serve as a general purpose hardware editor allowing the user to edit RAM, I/O ports, or registers, and the like.

Figure 2:
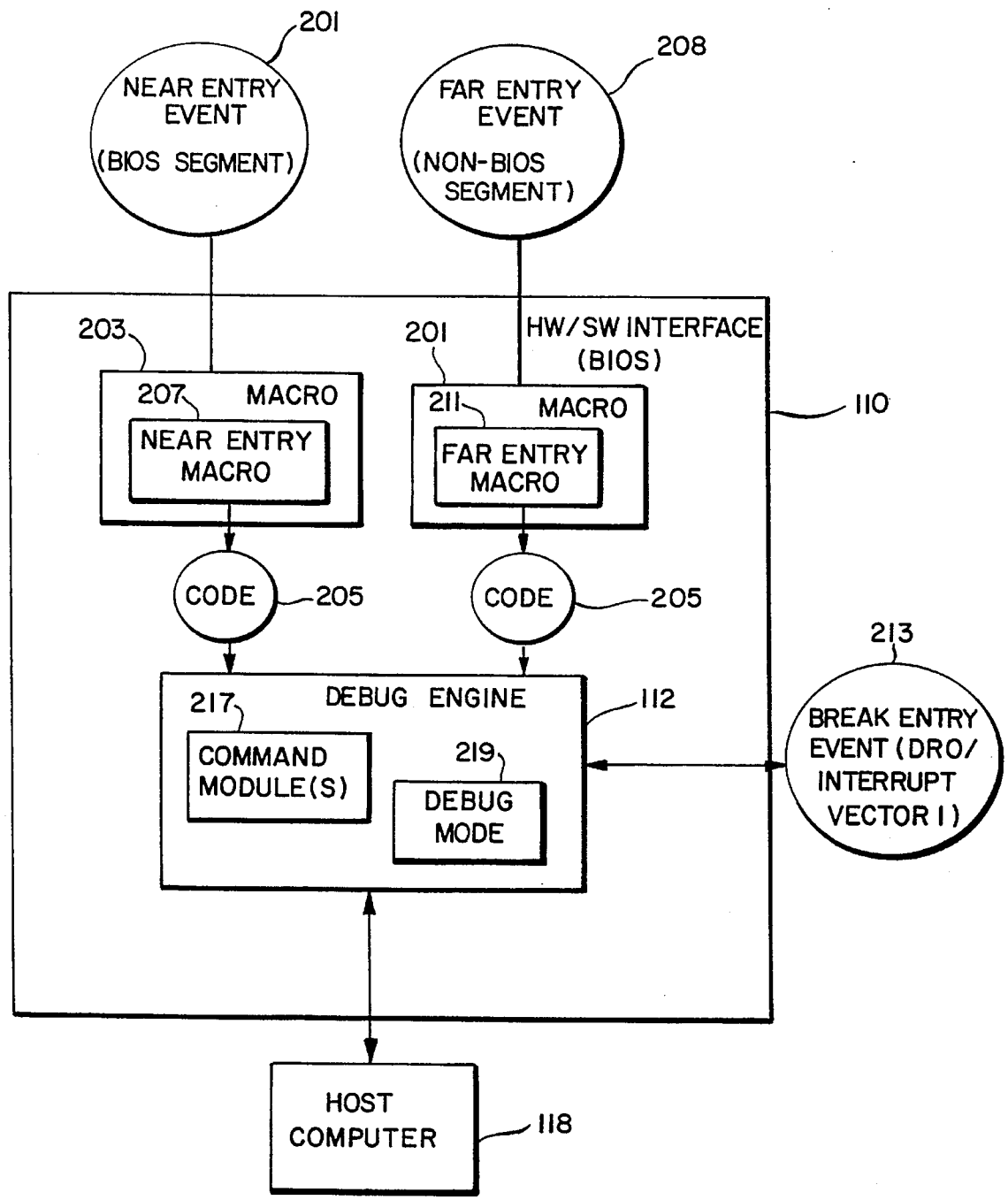
FIG. 2 is a simplified block diagram of one embodiment of debug engine 112.

FIG. 2 is a simplified block diagram illustrating BIOS 110 including debug engine 112. In one embodiment, debug engine 112 boot defaults are setup at memory location F000:E3f0H of PhoenixBIOS 1.03 (also called CBG103), and in the BCPS.INC file in PhoenixBIOS 4.0 (also called NuBIOS). See Tables I and II below. PhoneixBIOS 1.03 and PhoenixBIOS 4.0 are comercially available BIOS. Debug engine 112 facilitates the debugging of development system 102. Debug codes 205 are sent to host computer 118. Host computer 118 sends debug commands to debug engine 112, which executes the debug command on development system 102 and may send debug data to host computer 118. Debug engine 112 itself requires approximately 3K bytes in BIOS 110. A flowchart of the interrupt-handling and debug command processing of debug engine 112 is further detailed below with reference to FIGS. 3 and 4.

Conventionally, certain events or interrupts 201,208 during operation of development system 102 initiate macros, functions, or programs 203,209 in BIOS 110 that output information or codes 205 to a designated manufacturing diagnostics port. These events 201,208 may occur, for example, during the power-on-self-test (POST) of the development system, the providing of BIOS services, power management services, operating system startup, power management runtime services, and/or application software services. The designated diagnostics port 116 is generally port 080H, thus macros 203,209 are commonly referred to as port 80 macros and codes 205 are referred to as port 80 codes. See, for example, a list of port 80 codes as set forth in Appendix B which is attached hereto to form a part hereof. In addition, "beep codes" 205 are used to identify POST errors that occur when a monitor or screen is not available (e.g., not available or not functioning). See also Appendix B for example beep codes. Beep, status, warning, debug, port 80, interrupt, operating system, error, signal, diagnostic, and other similar information output from development system 102 are collectively referred to as "codes" 205. Normally, these codes 205 are not displayed. However, during development of development system 102, a diagnostic computer card can be inserted into a port 80 slot (116) to display the output codes 205. Such computer cards are conventionally known as diagnostic port 80 cards and are commercially available. As described above, certain ICE machines can also access some of these codes 205.

According to the present invention, BIOS-segment macro 203 (e.g., an interrupt-handling macro in segment F000) comprises near entry macro 207. Near entry macro 207 directs output code 205 to debug engine 112. From debug engine 112 code 205 can be sent to host 118 via communication channel 106. Near entry interrupts or events 201 only require an offset address to enter debug engine 112 (as opposed to a segment and offset) because they occur in the BIOS segment where debug engine 112 is normally located (e.g., F000segment). In one embodiment, near entry macro 207 is approximately 19 bytes. See Appendix C for a listing of example entry macros for PhoenixBIOS 1.03 and PhoneixBIOS 4.0

Similarly, various interrupts or events occurring in segments other than BIOS segment, or far entry events 208, also initiate interrupt-handling macros 209 that output codes 205. For example, power management, operating system (OS), video, application software interrupts, and other programs that do not reside in the BIOS segment may initiate interrupts that are handled by macros 209. Macro 209 comprises far entry macro 211 which also directs output code 205 to debug engine 112. Far entry macro 211 provides, among other things, the segment and address of debug engine 112 (e.g., F000:E3f0H in PhoenixBIOS 1.03). The size of far entry macro is approximately 44 bytes. Far entry macro 211 also comprises a reference to the segment it is used in. This enables debug engine 112 to return to the running program correctly after a debugging session. For example, to use the invention in a power management macro 209, far entry macro 211 should reference the segment that power management is running in. See Appendix C for a listing of example entry macros for PhoenixBIOS 1.03 and PhoneixBIOS 4.0

The function of near 207 and far 211 entry macros can be accomplished in one entry macro, however, memory is saved by providing separate entry macros for each type of macro. For example, one macro that provides to an interrupt macro 203/209 the segment:offset location of debug engine 112 in BIOS 110 and a reference to the macro it is used in could be constructed. Alternatively, a separate custom entry macro could be provided for each every macro 203,209.

Most CPUs have temporary storage registers (e.g., DR0 through DR7 in Itnel products). In one embodiment, near 207 and far 211 entry macros utilize various CPU debug registers for temporary storage (e.g., DR1 through DR3 registers). In one embodiment, if BIOS 100 is PhoneixBIOS 4.0 and debug engine 112 is not included in the BIOS segment, the contents of the debug registers (e.g., DR0–DR 7) will not be modified or destroyed. Thus, after debugging development system 102, debug engine 112 can be disabled (e.g., not linked into BIOS) without further effect on development system 102.

In one embodiment, code 205 is passed to entry macros 207, 211 as a parameter or by using a register (e.g., AL register). Both near 207 and far 211 entry macros can execute in stack or stackless environments. Also, in macros 203, 209, some "JMP short" (e.g., jump less than a set number of addresses) instructions might have to be changed to regular JMP instructions because of the additional address space occupied by the near 207 and far 211 entry macros.

If too many macros 203,209 (e.g., port 80 code display macros) have been modified to include entry macros 207, 211, BIOS 110 may be too large and build incorrectly (e.g., link and compile incorrectly). Several steps can be taken to alleviate this problem. For example, the unused features in BIOS or Power Management may be turned off to create more space, or the BIOS size may be made larger (e.g., modify Code Size and the ROM size in ROMOPT.INC file in PhoenixBIOS 1.03), or unused port 80 macros in the BIOS may be removed, or only the macros 203,209 for areas to be debugged (e.g., BIOS, Power Management, Video) may be modified to include entry macros 207, 211.

It is also possible to enter debug engine 112 via a break address set or DR0 interrupt 1 (213). When the address of the instruction being executed on development system 102 is equal to the address set in DR0, the break address, then a break entry into debug engine 112, defined by interrupt vector 1, will be made 213.

Debug engine 112 also comprises various debug command modules 217 that perform various debug commands such as memory dump, move memory data, modify memory content, trace break address, replace debug code, exit process, go execute process, go to next debug code, interrupt set, break address replace, disable DR0 break, and the like. Debug engine 112 receives debug commands form host computer 118 via communication channel 106 (e.g., bi-directional parallel port) and responds by executing command modules 217 and sending data, if requested, to host 118 via communication channel 106. Commands may be entered by a user through debug software 120 and/or user interface 122 running on host computer 118. Thus, the user is able to remotely and interactively debug development system 102 via communication channel 106. Debug mode or I/O mode 219 may be selectively set by the user to alter the communication of codes 205 to I/O port 116 (e.g., port 80) and/or communication channel 106. In one embodiment, BIOS 110 is PhoenixBIOS 1.03, and debug mode 219 may be set as follows: in the COMPAS.ASM file, the following lines as set forth in Table I are added before the SYNCA HRDDSRA hard disk DSR interrupt 13h:

TABLE I

| | | |
|---|---|---|
| SYNCA | 0E3F0h | ;boot default for debug engine |
| EXTRN | debugEngineFarEntry:NEAR | ;relocate debug engine |
| dw | debugEngineFarEntry | ;offset of the debug engine |
| dw | 0F000H | ;segment of the debug engine |
| dw | 0003H | ;UO or debug mode |
| dw | 5A00H | ;break code default (00) |
| db | 00,00 | ;reserved |
| PRGSIZA | | ;display program size (reserved) | where debug mode = DEBUG type, and default = 0003H
Bit 0–3  0  DEBUG Off, codes not displayed on remote or on port 80H
         1  Port 80H, codes displayed on port 80H only
         2  Parallel 1 (378H), codes displayed on remote and port 80H

TABLE I-continued

|     |   |                                                              |
|-----|---|--------------------------------------------------------------|
|     | 3 | Parallel 2 (3BCH), codes displayed on remote adn port 80H    |
|     | 4 | Parallel 3 (278H), codes displayed on remote and port 80H    |
|     | 5 | Serial 1 (3F8H), codes are displayed on remote and port 80H  |
|     | 6 | Serial 2 (2F8H), codes are displayed on remote and port 80H  |
| Bit 4 | 0 | no delay for code display (default mode)                   |
|     | 1 | delay inserted for all debug codes                           |
| Bit 5 | 0 | Reserved for debug engine                                  |
| Bit 6–7 | 0 |                                                          |

In another embodiment, BIOS 110 is PhoenixBIOS 4.0, and debug mode 219 is set in the C:\NUBIOS\INCLUDE\BCPS.INC file, by setting values to variables as set forth in Table II according to the communication port 106 available on development system 102.

TABLE II

```
dbpDebugStruc STRUC
    Header bcpHeader.<'BCPDBG", 1.0,SIZEObcpDebug Struc>
    DEBUG_OFF          EQU 0     ;DEBUG Off
    DEBUG_PORT80       EQU 1     ;codes displayed on port 80H only
    DEBUG_PARALLEL1    EQU 2     ;parallel port 1 (378h) and port 80H
    DEBUG_PARALLEL2    EQU 3     ;parallel port 2 (3BCh) and port 80H
    DEBUG_PARALLEL3    EQU 4     ;parallel port 3 (278h) and port 80H
    DEBUG_SERIAL1      EQU 5     ;serial port 1 (3F8h) and port 80H
    DEBUG_SERIAL2      EQU 6     ;serial port 2 (2F8h) and port 80H
    DEBUG_DELAY        EQU 16    ;insert debug delay for debug codes
    debugMode          DW        ;bcpiDebugMode
    debugBreakCode     DW        ;bcpiDebugBreakCode default
bcpDebugStruc ENDS
    bcpiDebugMode      =DEBUG_PARALLEL1
    bcpiDebugBreakCode= 05AFEH        ;05AFEH, 5AH is an identifier for
                                      ;Debugging communication. The
                                      ;default Break Code is FE and can be
                                      ;changed to any other value
```

Then, add to the BCP.ASM file at the SAMPLES or OEM level to link the debug engine to the BIOS:

MAKE_BC P_DEBUG

INSTALL_DEBUG

When debug mode 219 is set to direct codes 205 to communication channel 106, the user needs to ensure that the communication channel chosen 106 is properly programmed and functional. One embodiment of debug engine 112 assumes that parallel port 106 always power up bi-directional, enabled, and set to port 3BCH. Most parallel ports are bi-directional parallel ports and usually default to bi-directional and enabled upon power up or reset. However, some development systems 102 may require the parallel port to be specifically enabled, assigned a certain address, and/or set to bi-directional after every power up or reset. If so, initialization code may be added to debug engine 112 prior to use. Parallel port base address can be modified to, for example, 3BCH, 378H, or 278H as specified above.

Figure 3:
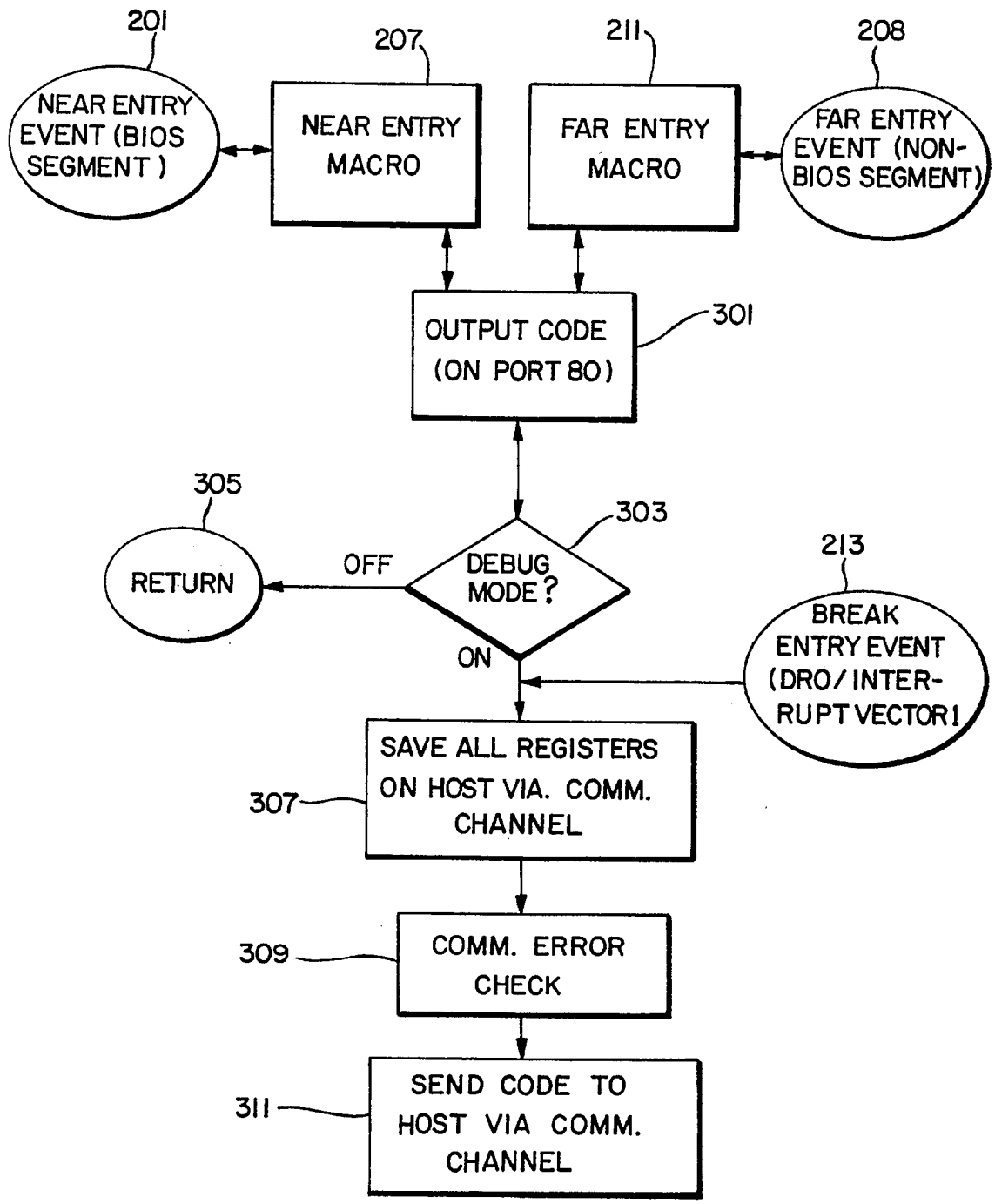
FIG. 3 is a flowchart of one embodiment of the interrupt-handling method of the debugging invention.
Figure 4:
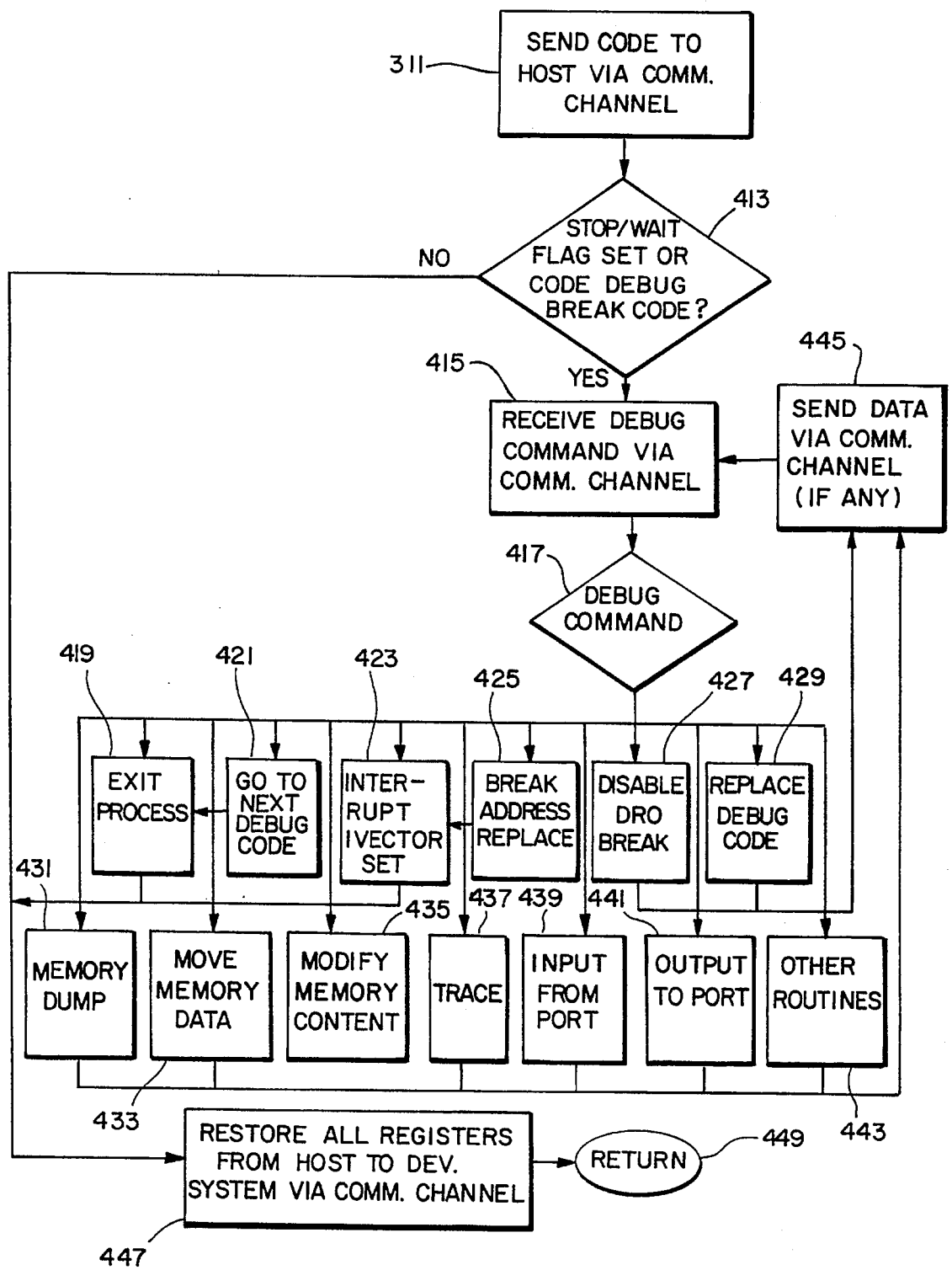
FIG. 4 is a continuation of FIG. 3 and is a flowchart of one embodiment of the debug command processing method of the debugging invention.

FIGS. 3 and 4 comprise a flowchart of one embodiment of the debugging method of the present invention. As described with reference to FIG. 2, depending on event 201,208, either near entry macro 207 (e.g, interrupts from segment F000H) or far entry macro 211 (e.g., interrupts from segments other than F000H) is used by macros 203,209, respectively, to enter debug engine 112. Unless all debug communication is disabled (e.g., debug mode 219 is 0 in Table I), code 205 is output 301 to port 80 or other designated diagnostics port. If communication to host computer 118 is not enabled 303 (e.g., debug mode 219 is 1 in Table I), a return 305 is made to the program running on development system 102 (e.g., at the next address). Another code 205 may then processed similarly. If communication to host computer is enabled 303 (e.g., debug mode 219 is not 0 or 1 in Table I), the contents of various registers in development system 102 are saved 307 on host computer 118 via communication channel 106 (see Table I or II for communication channel designation, for example). Because the development system 102 registers are saved on host computer 118, the present invention can be used in a stackless environment. Alternatively, development system registers can be pushed to a stack on development system 102, if available. A communication channel error check is made 309, and code 205 is sent 311 to host computer 118 via communication channel 106.

The method illustrated in the flowchart of FIG. 3 continues 311 in FIG. 4. After sending code 205 to host computer 118 (311), debug engine 112 determines 413 if a stop/wait flag is set, or if code 205 is a designated debug code (e.g., port 80 or beep code). If the determination at step 413 is "no", the contents of all registers are restored from host computer 118 via communication channel 106 (447) and a return to the program running on development system 102 may resume 449 (e.g., at the next address). Another code 205 may be processed similarly.

If the determination at step 413 is "yes" (e.g., stop/wait flag set or break code is equal to a designated break code), development system 102 stops executing and debug engine 112 awaits a debug command from host computer 118 via communication channel 106 (415). Depending on debug command 417 issued from host computer 118, debug engine 112 responds by executing the requested command 417 on development system 102. Conventional debug commands 417 may be issued to debug engine 112 as determined by, for example, debug software 120 running on host computer 118. See above in reference to debug 120 and Appendix A for a list of typical commands. Debug engine 112 comprises modules 419–443 (217) that, for example, execute the command 417 on development system 102, send data to host computer 118, and/or return to the running program.

For example, debug engine 112 may comprise the following modules in order to execute the corresponding command 417: exit process 419 or go execute process 421 (followed by exit process 419), will exit the debug engine process 447 and return to the next program process or return and execute the designated process 449; interrupt 1 vector set 423 sets a break address (set break entry point 213); break address replace 425, replaces the break address; disable DR0 break 427 disables the DR0 break interrupt; replace debug code 429 replaces the designated debug break code; memory dump 431 reads current memory storage, or a subset thereof (e.g., ROM 108 and/or RAM 114) and sends this information to host computer 118 (445); move memory data 433 moves memory in memory (e.g., RAM 114); trace 437, turns the tracer on and sends such data to host computer 118 (445); input from port 439 instructs debug engine to read data or an instruction from a designated I/O port; output to port 44 1 instructs debug engine to write to a designated I/O port. Other commands 417 may also be similarly implemented in corresponding modules 443.

Note, for the PhoenixBIOS 1.03 base code 110, when entering the power management SMI (system management interface) environment, debug engine 112 saves 307 and restores 447 the CPU debug registers (e.g., DR0 through DR7 for Intel products). Thus, if the user sets a break at an address (e.g., using DR0) 425 inside the SMI mode, this address may be overwritten when the registers are restored 447. Therefore, the save 307 and restore 447 routines of debug engine 112 may be removed to avoid overwriting.

When entering the SMI environment, the CPU 104 copies the content of the DR7 CPU register to SMRAM, clears the DR7 register and then restores its contents upon exit from SMI. This will disable the user specified break at an address feature 425 while in the SMI mode. Accordingly, the contents the DR7 register may be restored upon entry to the SMI environment from the SMRAM, or the break address command can be reactivated while inside the SMI.

Some parallel port cards may require substantial power to drive the input data to low (e.g., cards not designed according to conventional PS/2 bus standards). When such parallel port cards are used in conjunction with some notebook-type computers 112 which are designed to save power, development system 102 may not be able to drive parallel port data line 106. In this situation, a different parallel card (e.g., with lower power requirement), or a host computer 118 with a higher drive parallel port may be used.

During the initialization of development system 102 (e.g., during a POST), the operating system (e.g., DOS) may replace the interrupt vector 1 to its own interrupt vector. Therefore, interrupt vector 1 break addresses set 423 during POST and before DOS is initialized may not break at the address selected if the execution of the address happens after DOS boot. Break addresses set after DOS boot 423 will replace the interrupt vector 1 and will function correctly. Also, in order to break at an address specified by the user 423, the CPU requires stack space in memory 108. Thus, in a no-stack environment, alternate stack space is required in order to break at a specified address 423.

APPENDIX A

EXAMPLE DEBUG COMMANDS

| Command | Description |
| --- | --- |
| AC[CESS] | Execute chipset I/O access utility |
| B XXXX:XXXX or | |
| B <Pattern>[+X(Hex)] | Add or replace the current break address with a new break address or a Symbol |
| BC | Turn OFF the break address |
| BO | Turn ON the break address |
| C | Clear the debug code that the user wants to break at |
| C ## | Replace the current debug code to a new debug code |
| CHIP[SET] | Execute chipset I/O access utility |
| D XXXX:XXXX LENGTH | Default length is 128 bytes Dump memory location XXXX:XXXX to the screen, if the command line parameter switch /DTM is enabled then dump the data to 7000:0H on the remote computer also. |
| DM XXXX:XXXX LENGTH | Default length is 128 bytes DM will not dump to the screen and will only save at 7000:0H |
| D <Pattern>[+X(Hex)] | Dump at first symbol that contains the "Pattern" |
| DN | Dump at next symbol that contains the "Pattern" |
| DOS | Exit this program temporarily and go to the DOS prompt The user can return to this program by typing EXIT at the DOS prompt |
| E XXXX:XXXX DATA | Enter data at memory location XXXX:XXXX |
| F | Finds a given Symbol's value |
| FN | Finds the next symbol's value |
| G | Go to end, or stop at break address if debug register is set |
| G XXXX:XXXX | Go to the specified break address and stop |
| GN ## | Go to next or specified port 80h code or break address |
| H or ? | Help menu, will display this menu |
| I/IW/ID PORT | Read from a 8/16/32 bit I/O port |
| L | Will load a new map file for Symbolic debugging |
| M XXXX:XXXX LENGTH | Move a block of data from 7000:0 on the remote computer to specified memory on the development system. Length is the size of transfer in bytes |
| N | While break codes are being displayed this instruction will break at the next break code. This instruction can be used when the debugger is not stopped at the command prompt |
| O/OW/OD PORT DATA | Output data to 8/16/32 bit I/O port |
| P | Continues execution and bypasses CALL, INT, LOOP, or REP instructions |

APPENDIX A-continued

EXAMPLE DEBUG COMMANDS

| | |
|---|---|
| Q | Quit this program. Available at all times |
| R | Display all the CPU register values and break code/address information |
| R [REGISTER] [Value] | Modify the register specified (16/32 bit registers) |
| R flags | Will allow the lower 8 bit flags to be modified |
| REGSON | Will cause the registers to be dumped with every T, G, P, and S command. |
| REGSOFF | Will cause the registers not to be dumped with every T, G, P, and S command |
| RESET | Will reset the development computer by issuing a hardware reset via the keyboard controller |
| S | Sets breakpoint to the instruction following the current instruction and then starts the execution. This is a useful command for JMPR Macro bypass. |
| T | Single step trace. This function can only be used after a break address. |
| U XXXX:XXXX LENGTH | Disassembles at memory location specified. Default is CS:IP |
| U <Pattern>[+X(hex)] | Disassembles at First symbol that contains the "pattern" specified. |
| UN | Disassembles at next symbol that contains the "pattern" specified. |

Break Address = Break Addresses are memory addresses that would generate a break instruction upon execution of code from that memory address and would cause the Debug Engine to stop and wait for a response from the remote computer.
Display Code = Traditional Port 80H codes used for debugging.
Break Code = Traditional Port 80H codes used to stop processing and review of registers/I/O/memory.

APPENDIX B

EXAMPLE DEBUG CODES USED IN VARIOUS BIOS
(PORT 80 AND BEEP CODES)

| | | |
|---|---|---|
| E_REGS | EQU 01h | ; CPU register test in-progress |
| E_CRAM | EQU 02h | ; 1-1-3 CMOS write/read test in-progress or failure |
| E_BROM | EQU 03h | ; 1-1-4 BIOS ROM checksum in-progress or failure |
| E_TIMR | EQU 04h | ; 1-2-1 Programmable Interval Timer test in-progress or failure |
| E_DMAI | EQU 05h | ; 1-2-2 DMA initialization in-progress or failure |
| E_PAGE | EQU 06h | ; 1-2-3 DMA page register write/read test in-progress or fail |
| E_REFR | EQU 08h | ; 1-3-1 RAM refresh verification in-progress or failure |
| E_RAM0 | EQU 09h | ; 1st 64K RAM test in-progress |
| E_MMUL | EQU 0Ah | ; 1-3-3 1st 64K RAM chip or data line failure - multi-bit |
| E_MOEL | EQU 0Bh | ; 1-3-4 1st 64K RAM odd/even logic failure |
| E_MADD | EQU 0Ch | ; 1-4-1 1st 64K RAM address line failure |
| E_RAMP | EQU 0Dh | ; 1-4-2 1st 64K RAM parity test in_progress or failure |
| IFDEF | RRREISA | |
| E_FSTIMR | EQU 0Eh | ; 1-4-3 fail-safe timer test in progress |
| E_NMIIO | EQU 0Fh | ; 1-4-4 software NMI port test in progress |
| ENDIF | RRREISA | |
| E_MBIT | EQU 10h | ; 2-1-1 1st 64K RAM chip or data line failure - bit 0 |
| ; | 11h | ; 2-1-2 1st 64K RAM chip or data line failure - bit 1 |
| ; | 12h | ; 2-1-3 1st 64K RAM chip or data line failure - bit 2 |
| ; | 13h | ; 2-1-4 1st 64K RAM chip or data line failure - bit 3 |
| ; | 14h | ; 2-2-1 1st 64K RAM chip or data line failure - bit 4 |
| ; | 15h | ; 2-2-2 1st 64K RAM chip or data line failure - bit 5 |
| ; | 16h | ; 2-2-3 1st 64K RAM chip or data line failure - bit 6 |
| ; | 17h | ; 2-2-4 1st 64K RAM chip or data line failure - bit 7 |
| ; | 18h | ; 2-3-1 1st 64K RAM chip or data line failure - bit 8 |
| ; | 19h | ; 2-3-2 1st 64K RAM chip or data line failure - bit 9 |
| ; | 1Ah | ; 2-3-3 1st 64K RAM chip or data line failure - bit A |
| ; | 1Bh | ; 2-3-4 1st 64K RAM chip or data line failure - bit B |
| ; | 1Ch | ; 2-4-1 1st 64K RAM chip or data line failure - bit C |
| ; | 1Dh | ; 2-4-2 1st 64K RAM chip or data line failure - bit D |
| ; | 1Eh | ; 2-4-3 1st 64K RAM chip or data line failure - bit E |
| ; | 1Fh | ; 2-4-4 1st 64K RAM chip or data line failure - bit F |
| E_DMAS | EQU 20h | ; 3-1-1 slave DMA register test in-progress or failure |
| E_DMAM | EQU 21h | ; 3-1-2 master DMA register test in-progress or failure |
| E_PIC0 | EQU 22h | ; 3-1-3 master interrupt mask register test in-progress or fail |
| E_PIC1 | EQU 23h | ; 3-1-4 slave interrupt mask register test in-progress or fail |
| E_IVLD | EQU 25h | ;interrupt vector loading in-progress |
| E_KEYC | EQU 27h | ; 3-2-4 keyboard controller test in-progress or failure |
| E_CVER | EQU 28h | ;CMOS power-fail and checksum checks in-progress |
| E_CCON | EQU 29h | ;CMOS config info validation in-progress |
| E_CRTM | EQU 2Bh | ; 3-3-4 screen memory test in-progress or failure |
| E_CRTI | EQU 2Ch | ;3-4-1 screen initialization in-progress or failure |
| E_CRTR | EQU2Dh | ;3-4-2 screen retrace tests in-progress or failure |
| E_VROM | EQU 2Eh | ;search for video ROM in-progress |

APPENDIX B-continued

| | | |
|---|---|---|
| E_OK | EQU 30h | ;screen believed operable: |
| | 30h | ;screen believed running w/video ROM |
| | 31h | ;monochromatic screen believed operable |
| | 32h | ;40-column color screen believed operable |
| | 33h | ;8column color screen believed operable |
| E_TIMRI | 34h | ;4-2-1 timer tick interrupt test in progress or failure |
| E_SHUTD | EQU 35h | ;4-2-1 shutdown test in_progress or failure |
| E_GTA20 | EQU 36h | ;4-2-3 gate A20 failure |
| E_PMUXI | EQU 37h | ;4-3-1 RAM test in_progress or failure above address OFFFFh |
| E_TIMR2 | EQU 3Ah | ;4-3-3 Interval timer channel 2 test in progress or failure |
| E_TODCK | EQU 3Bh | ;4-3-4 Time-of-Day clock test in_progess or failure |
| E_SRLPT | EQU 3Ch | ;4-4-1 Serial port test rest in_progess or failure |
| E_PRLPT | EQU 3Dh | ;4-4-2 Parallel port test test in_progress or failure |
| E_80287 | EQU 3Eh | ;4-4-3 Math Coprocessor test in_progess or failure |

;These are the values used for the Chip Set module HTSUMMIT HTK320

| | | |
|---|---|---|
| E_CSINIT | EQU 050h | ;beginning of CSET_INIT |
| E_CSRCM | EQU 051h | ;beginning the RCM table |
| E_CSDYN | EQU 052h | ;loading the FCM table, doing DMC |
| E_CSEP1 | EQU 053h | ;entering CSET_BFR_VIDROM |
| E_CSEP2 | EQU 054h | ;entering CSET_BFR_SIZMEN |
| E_CSEP3 | EQU 055h | ;entering CSET_AFT_MTEST |
| E_CSEP4 | EQU 056h | ;entering CSET_AFT_CMCFG |
| E_CSEP5 | EQU 057h | ;entering CSET_BFR_OPROM |
| E_CSEP6 | EQU 0h | ;existing CSET_BRR_OPROM |

CGG103 Port 80 Codes and usage in Files

| | | |
|---|---|---|
| CHIPSET.ASM 379 9: | TREPORT E_CSINIT | ;50 tell the diagnostic port where we are |
| CHIPSET.ASM 518 9: | TREPORT E_CSRCM | ;51 Tell Port 80h where we are. |
| CHIPSET.ASM 542 9: | TREPORT E_CSDYN | ;51 Tell Port 80h where we are. |
| CHIPSET.ASM 684 8: | TREPORT E_CSEP1 | ;53 tell the diagnostic port where we are. |
| CHIPSET.ASM 750 9: | TREPORT E_CSEP2 | ;54 tell the diagnostic port |
| CHIPSET.ASM 767 9: | TREPORT E_CSEP3 | ;55 tell the diagnostic port where we are |
| CHIPSET.ASM 849 8: | TREPORT E_CSEP4 | ;56 tell the diagnostic port where we are |
| CHIPSET.ASM 896 8: | TREPORT E_CSEP5 | ;57 tell the diagnostic port where we are |
| CHIPSET.ASM 912 8: | TREPORT E_CSEP6 | ;0 tell the diagnostic port where we are |
| CHIPSET.ASM 1415 9: | TREPORT 0B0h | ;b0 |
| CHIPSET.ASM 1427 9: | TREPORT 0Bh | ;b0 |
| CHIPSET.ASM 1439 9: | TREPORT 0B2 | ;B2 |
| COMMSTES.ASM 177 9: | TREPORT E_DMAS | ;20 |
| COMMSTES.ASM 197 9: | TREPORT E_DMAN | ;21 |
| COMMSTES.ASM 227 9: | TREPORT E_PIC0 | ;22 |
| COMMSTES.ASM 242 9: | TREPORT E_PICI | ;23 |
| COMMSTES.ASM 268 9: | TREPORT E_IVLD | ;25 |
| COMMSTES.ASM 470 9: | TREPORT E_KEYC | ;27 |
| COMMSTES.ASM 570 9: | TREPORT E_CVER | ;28 announce test |
| CONFCHK.ASM 108 9: | TREPORT E_TODCK | ;3B report start of test |
| CONFCHK.ASM 208 9: | TREPORT E_SRLPT | ;3C |
| CONFCHK.ASM 252 9: | TREPORT E_PRLPT | ;3D |
| CONFCHK.ASM 291 9: | TREPORT E_80287 | ;3E |
| CONFCHK.ASM 494 9: | TREPORT 056h | ;tell the diagnostic port where we are |
| CONFSCHK.ASM 525 10: | TREPORT 059h | ;59 tell the diagnostic port where we are |
| CUSTINIT.ASM 108 9: | TREPORT E_TIMRI | ;34 |
| CUSTINIT.ASM 169 9: | TREPORT E_SHUTD | ;35 report shutdown test-in-prog |
| CUSTINIT.ASM 454 9: | TREPORT E_TIMR2 | ;3A |
| IOTESTS.ASM 86 9: | TREPORT E_TIMR | ;04 |
| IOTESTS.ASM 226 9: | TREPORT E_DMAI | ;05 |
| IOTESTS.ASM 320 9: | TREPORT E_PAGE | ;06 |
| IOTESTS.ASM 392 9: | TREPORT E_REFR | ;08 |
| IOTESTS.ASM 442 9: | TREPORT E_RAM0 | ;09 |
| KEYBOARD.ASM 875 9: | TREPORT E_BAMEM | ;38 |
| MEMORY.ASM 272 9: | TREPORT E_RAMP | ;0D |
| POSTEXEC.ASM 202 9: | TREPORT 091h | ;91 |
| POSTEXEC.ASM 291 9: | TREPORT E_REGS | ;01 |
| POSTEXEC.ASM 401 9: | TREPORT E_CRAM | ;02 |
| POSTEXEC.ASM 443 9: | TREPORT E_BROM | ;03 |
| POSUBS.ASM 631 9: | TREPORT E_CRTM | ;2B |
| POSUBS.ASM 674 9: | TREPORT E_CRTI | ;2C |
| POSUBS.ASM 682 9: | TREPORT E_CRTR | ;2D |
| VIDSET.ASM 125 9: | TREPORT E_CCON | ;29 check configuration |
| VIDSET.ASM 301 9: | TREPORT E_CRTI | ;2C |
| VIDSET.ASM 407 9: | TREPORT E_VROM | ;2E report the start of searching |
| CSMACROS.INC 662 9: | TREPORT E_CSDYN | ;52 Tell port 80h where we are |

PhoenixBIOS 4.0 (NuBIOS) Port 80 codes

| | |
|---|---|
| TP_VERIFY_REAL | EQU 002h |
| TP_GET_CPU_TYPE | EQU 004h |
| TP_HW_INIT | EQU 006h |
| TP_CS_INIT | EQU 008h |
| TP_SET_IN_POST | EQU 009h |
| TP_CPU_INIT | EQU 00Ah |
| TP_CACHE_INIT | EQU 00Ch |

APPENDIX B-continued

| | |
|---|---|
| TP_IO_INIT | EQU 00Eh |
| TP_PM_INIT | EQU 010h |
| TP_USERPATCH0 | EQU 012h |
| TP_8742_INIT | EQU 014h |
| TP_CHECKSUM | EQU 016h |
| TP_TIMER_INIT | EQU 018h |
| TP_DMA_INIT | EQU 01Ah |
| TP_RESET_PIC | EQU 01Ch |
| TP_REFRESH | EQU 020h |
| TP_8742_TEST | EQU 022h |
| TP_SET_HUGH_ES | EQU 024h |
| TP_ENABLE_A20 | EQU 026h |
| TP_SIZE_RAM | EQU 028h |
| TP_ZERO_BASE | EQU 02Ah |
| TP_ADDR_TEST | EQU 02Ch |
| TP_BASERAML | EQU 02Eh |
| TP_BASERAMH | EQU 030h |
| TP_COMPUTE_SPEED | EQU 032h |
| TP_CMOS_TEST | EQU 034h |
| TP_CS_RESUME | EQU 036h |
| TP_CS_REINIT | EQU 037h |
| TP_SYS_SHADOW | EQU 038h |
| TP_CACHE_REINIT | EQU 039h |
| TP_CACHE_AUTO | EQU 03Ah |
| TP_ADV_CS_CONFIG | EQU 03Ch |
| TP_READ_HW | EQU 03Eh |
| TP_SPEED | EQU 040h |
| TP_VECTOR_INIT | EQU 042h |
| TP_SET_BIOS_INT | EQU 044h |
| TP_COPYRIGHT | EQU 046h |
| TP_CONFIG | EQU 048h |
| TP_PCI_OP_INIT | EQU 047h |
| TP_PCI_INIT | EQU 049h |
| TP_VIDEO | EQU 04Ah |
| TP_VID_SHADOW | EQU 04Ch |
| TP_CR_DISPLAY | EQU 04Eh |
| TP_CPU_DISPLAY | EQU 050h |
| TP_KB_TEST | EQU 052h |
| TP_KEY_CLICK | EQU 054h |
| TP_ENABLE_KB | EQU 056h |
| TP_HOT_INT | EQU 058h |
| TP_DISPLAY_F2 | EQU 05Ah |
| TP_MEMORY_TEST | EQU 05Ch |
| TP_BASE_ADDR | EQU 05Eh |
| TP_EXT_MEMORY | EQU 060h |
| TP_EXT_ADDR | EQU 062h |
| TP_USERPATCH1 | EQU 064h |
| TP_CACHE_ADVNCD | EQU 066h |
| TP_CACHE_CONFIG | EQU 058h |
| TP_DISP_CACHE | EQU 06Ah |
| TP_DISP_SHADOWS | EQU 06Ch |
| TP_DISP_NONDISP | EQU 06Eh |
| TP_ERROR_MSGS | EQU 070h |
| TP_TEST_CONFIG | EQU 072h |
| TP_RTC_TEST | EQU 074h |
| TP_KEYBOARD | EQU 076h |
| TP_KEYLOCK | EQU 07Ah |
| TP_HW_INTS | EQU 07Ch |
| TP_COPROC | EQU 07Eh |
| TP_IO_BEFORE | EQU 080h |
| TP_RS232 | EQU 082h |
| TP_LPT | EQU 084h |
| TP_IO_AFTER | EQU 086h |
| TP_BIOS_INIT | EQU 088h |
| TP_INIT_EXT_BDA | EQU 08Ah |
| TP_FLOPPY | EQU 08Ch |
| TP_AUTOTYPE | EQU 08Eh |
| TP_FDISK | EQU 090h |
| TP_FDISKLOCALBUS | EQU 091h |
| TP_USERPATCH2 | EQU 092h |
| TP_DISABLE_A20 | EQU 094h |
| TP_CLEAR_HUGH_ES | EQU 096h |
| TP_ROM_SCAN | EQU 098h |
| TP_MISC_SHADOW | EQU 09Ah |
| TP_PM_SETUP | EQU 09Ch |
| TP_IROS | EQU 09Eh |
| TP_TIME_OF_DAY | EQU 0A0h |
| TP_KEYLOCK_TEST | EQU 0A2h |
| TP_KEY_RATE | EQU 0A4h |

APPENDIX B-continued

| | |
|---|---|
| TP_ERASE_F2 | EQU 0A8h |
| TP_SCAN_FOR_F2 | EQU 0AAh |
| TP_SETUP_CHECK | EQU 0ACh |
| TP_CLEAR_BOOT | EQU 0AEh |
| TP_ERROR_CHECK | EQU 0B0h |
| TP_POST_DONE | EQU 0B2h |
| TP_ONE_BEEP | EQU 0B4h |
| TP_PASSWORD | EQU 0B6h |
| TP_SYSTEM_INIT | EQU 0B8h |
| TP_PARITY | EQU 0BCh |
| TP_CLEAR SCREEN | EQU 0BEh |
| TP_CHK_RMDR | EQU 0BFh |
| TP_INT19 | EQU 0C0h |
| TP_EXCEPTION | EQU 0D0h |
| TP_UNKNOWN_INT | EQU 0D2h |
| TP_PENDING_INTS | EQU 0D4h |
| TP_SHUTDOWN_5 | EQU 0D6h |
| TP_SHUTDOWN_ERROR | EQU 0D8h |
| TP_EBM | EQU 0DAh |
| TP_SHUTDOWN10 | EQU 0DCh |

APPENDIX C

MODIFICATIONS TO VARIOUS BIOS

A. Example PhoenixBIOS 1.03 (CBG103) Modifications

1. Copy DEBUGCBG.ASM, the debug engine code (see FIGS. 3 and 4), to the system BIOS directory.

2. Modify the MAKEFILE to include DEBUGCBG.OBJ. Following is an example of the Make file.

```
objs2 =    casdsr.obj \
       xserv.obj     \
       timdsr.obj    \
       opsubs.obj    \
       auxdsr.obj    \
       cmssub.obj    \
       prtscr.obj    \
       tables.obj    \
       peri_all.obj  \
       filler.obj    \
       mod8k.obj     \
       fls_h4c.obj   \
       compas.obj    \
       debugcbg.obj
```

The following dependency line should be added to the Make file in addition to the above debugcbg.obj  :  debugcbg.asm $(INCS1)

3. Modify GENERIC.LNK to include DEBUGCBG, Add the DEBUGCBG after FLS_H4C file, before FILLR2:

CMSSUB, PRTSCR, CPU, FLS_H4C,
    DEBUGCBG, FILLR2, MOD8K, COMPAS

4. Modify the ROMOPT file to increase the codesize, if the size of the BIOS is larger than expected.

The ROMOPT.INC usually is copied from *.opt file. Change code size and ROM size to whatever size needed.

CODSIZ    EQU 42*1024
    ROMSIZ    EQU 48*1024

5. Modify the COMPAS.ASM to add the debug engine default parameters as shown in TABLE I above.

6. Rename the TREPORT MACRO to ATREPORT. Add the following new Macro (near entry) to BIOS\MACROS.INC.

TREPORT macro ERRCODE
    LOCAL    retAddr            ; Segment

APPENDIX C-continued

MODIFICATIONS TO VARIOUS BIOS

```
IFNDEF      NO_EXTRN
    EXTRN   debugEngineNearEntry:NEAR
ENDIF mov     dr3, eax                ; Save EAX in DR3
    mov     al,ERRCODE
    lahf                            ; Load the flags into AH
    shl     eax, 16                 ; Shift AX to higher word of EAX
    mov     ax, offset retAddr
    jmp     debugEngineNearEntry    ; Jump direct to the Debug Engine
retAddr:
        mov eax, dr3                ; Restore original EAX
ENDM
```

EXAMPLE MODIFICATIONS FOR USE IN POWER MANAGEMENT (Far Entry)

1. Modify \PM\MACROS.INC and replace DPORT and DPORTNW macros with the following new Macro:

```
DEBADDR         EQU 0E3F0H
DPORT macro ERRCODE
    LOCAL       retAddr
    LOCAL       ret1
    mov     dr3, eax                ; Save EAX in DR3
    lahf                            ; Load the flags into AH
    mov     al,ERRCODE              ; Save the Debug code in AL
    shl     eax, 16                 ; Shift AX to higher word of EAX
    mov     ax, ds                  ; Save DS in AX
    mov     dr2, eax                ; DR2 = flags 8 bits,errcode 8 bits,DS
                                    ; 16 bits
    mov     ax, 0F000H              ; Get the segment of the Debug Engine
    mov     ds, ax                  ; Load it into DS
    mov     ax, si                  ; Save SI in the higher 16 bits of EAX
    shl     eax, 16                 ; Get the Segment of current location of the
    mov     ax, cs                  ; Macro & save it in lower word Save the SI in AX
    mov     si, offset retAddr      ; Load offset of the return address
    jmp     dword ptr ds:[DEBADDR]  ; Jump indirect to the Debug Engine
retAddr:
        dw      offset Ret1         ; Offset of the next instr. to execute
        dw      0E800h              ; Segment of the code the Macro will
ret1:                               ; be expanded in
        mov     ds, ax              ; Restore DS
        mov     eax, dr1            ; DR1 contains the SI register
        mov     si, ax              ; Restore SI
        mov     eax, dr3            ; Restore EAX
ENDM DPORTNW macro ERRCODE
    LOCAL       retaddr
    LOCAL       ret1
    mov     dr3, eax                ; Save EAX in DR3
    lahf                            ; Load the flags into AH
    mov     al, errcode             ; Save the Debug code in AL
    shl     eax, 16                 ; Shift AX to higher word of EAX
    mov     ax, ds                  ; Save DS in AX
    mov     dr2, eax                ; DR2 = flags 8 bits,effcode 8 bits,DS 16 bits
    mov     ax,0F000H               ; Get the segment of the Debug Engine
    mov     ds, ax                  ; Load it into DS
    mov     ax, si                  ; Save SI in the higher 16 bits of EAX
    shl     eax, 16                 ; Get the Segment of current location of the
    mov     ax, cs                  ; Macro & save it in lower word Save the SI in AX
    mov     si, offset Ret_Addr     ; Load offset of the return address
    jmp     dword ptr ds:[DEBADDR]  ; Jump indirect to the Debug Engine
retAddr:
        dw      offset Ret1         ; Offset of the next instr. to execute
        dw      0E800h              ; Segment of the code the Macro will
ret1:                               ; be expanded in
        mov     ds, ax              ; Restore DS
        mov     eax, dr1            ; DR1 contains the SI register
        mov     si, ax              ; Restore SI
        mov     eax, dr3            ; Restore EAX
ENDM
```

NOTE: When passing the debug code, you can either pass it through AL or a Parameter to the Macro. For example:

APPENDIX C-continued

MODIFICATIONS TO VARIOUS BIOS

```
        DPORT 040H or
        DPORT AL
```

B. Example PhoenixBIOS 4.0 (NuBIOS) Modifications

1. Modify the BCP.ASM file at the OEM level to include your Debug Engine Code (see FIGS. 3 and 4) in the build.

Enter INSTALL_DEBUG in this file.

2. Setup default parameters that are used by debug engine in the BCPS.INC file as in Table II above.

3. There is a new Macro created for entering the debugger, this Macro is already added to the locations where the current TESTP Macro is used. In order to add additional debug points use the BREAK_POINT Macro from where you want to call the debug engine.

```
;********************PhoenixBIOS 4.0********************************
;Place the following in C:\NUBIOS\INCLUDE\GENERAL.INC file (Near Entry)
TESTP      MACRO      testNUMBER
      LOCAL   retAddr EXTERNDEF          debugEngineDispatch:NEAR mov    dr3, eax              ;Save EAX in DR3
      mov    al, testNumber        ;Shift AX to higher word of EAX
      lahf                         ;load the flags into AH
      shl    eax, 16               ;Shift AX to higher word of EAX
      mov    ax,offsetretAddr      ;Jump direct to the Debug Engine
      jmp    debugEngineDispatch
retAddr:
      mov    eax,dr3               ;Restore original EAX
ENDM ;These modification should be done in C:/CORE/STD/DEV/UTILS.ASM file
      EXTERNDEF          debugEngineNearEntryRet:NEAR
      EXTERN             debugEngineNearEngine (debugEngineNear
EntryRet):NEAR debugEngineDispatch:
      jmp    DebugEngineNearEntry    ; If debugEngine linled_in, go there DebugEngineNearEntryRet:
      mov    dr2, eax
      shr    eax, 16
      out    TEST_PORT, al
      sahf
      mov    eax, dr2
      jmp    ax                     ; jump back to the debug macro that jumped to us ; in C:\NUBIOS\INCLUDE\BCPS.INC, add or replace the following
INSTALL_DEBUG MACRO biosSegment SEGMENT
      EXTERN     debugEngineNearEntry:NEAR
biosSegment ENDS

ENDM

;-----------------------------------------------------------------------
; Macro for PhoenixBIOS 4.0 (NuBIOS) debug engine, Far Entry
;-----------------------------------------------------------------------
DEBADDR           EQU  0E3F0H
BREAK_POINT_FAR MACRO ERRCODE
      LOCAL    pmRetAddr
      LOCAL    pmRetOffset
      LOCAL    pmDebugRetSegment mov    dr3, eax              ; Save EAX in DR3
      lahf                         ; Load the flags into AH
      mov    al,ERRCODE            ; Save the Debug code in AL shl    eax, 16               ; Shift AX to higher word of EAX
      mov    ax, ds                ; Save DS in AX
      mov    dr2, eax              ; DR2 = flags 8 bits,errcode 8 bits,DS 16 bits
      mov    ax, BIOSCODESEG       ; Get the segment of the Debug Engine
```

APPENDIX C-continued

MODIFICATIONS TO VARIOUS BIOS

```
    mov     ds, ax                          ; Load it into DS
    mov     ax, si                          ; Save SI in the higher 16 bits of EAX
    shl     eax, 16                         ; Get the Segment of current location
    mov     ax, cs                          ; of the Macro & save it in lower word
    mov     WORD PTR cs:[pmDebugRetSegment], ax
                                            ; save the SI in AX
    mov     si, OFFSET pmRetOffset          ; Load offset of the return address
    jmp     dword ptr ds:[DEBADDR]          ; Jump indirect to the Debug Engine pmRetOffset:
    DW      OFFSET pmRetAddr                ; Offset of the next instr. to execute pmDebugRetSegment:                          ; This label is used in pminit.asm
    DW      0                               ; to set the smram segment pmRetAddr:
    mov     ds, ax                          ; Restore DS
    mov     eax, dr1                        ; DR1 contains the SI register
    mov     si, ax                          ; Restore SI
    mov     eax, dr3                        ; Restore EAX
ENDM
```

We claim:

1. In a development computing system having a processor and a memory with an interrupt-handling portion, a computer-implemented method for processing debug codes in the development system, the method comprising the steps of:

receiving, at a host computer operatively coupled to the development computing system, a debug code generated by the development computing system for processing by the processor; and directing the debug code from the host computer to a debug program located in the interrupt-handling portion of the memory of the development computing system.

2. The computer-implemented method of claim 1 wherein the debug code comprises a port 80 code.

3. The computer-implemented method of claim 1 wherein the debug code comprises a beep code.

4. The computer-implemented method of claim 1 wherein the debug code is directed to the debug program according to an entry program located in the interrupt-handling portion of the memory.

5. The computer-implemented method of claim 4 wherein the debug program corresponds to a memory location and the entry program provides the memory location.

6. The computer-implemented method of claim 4 wherein the debug program corresponds to a memory offset and the entry program provides the memory offset.

7. The computer-implemented method of claim 4 wherein the debug program corresponds to a segment and offset in memory and the entry program provides the segment and offset.

8. The computer-implemented method of claim 1 wherein the memory comprises read only memory (ROM).

9. The computer-implemented method of claim 1 wherein the interrupt-handling portion of the memory comprises a basic input/output system (BIOS).

10. The computer-implemented method of claim 1 wherein the interrupt-handling portion of the memory is in a ROM BIOS computer chip.

11. The computer-implemented method of claim 1 further comprising the step of:

directing the debug code to a host computer for debugging the development system, wherein the debug program directs the debug code to the host computer via a communication channel in the development system.

12. The computer-implemented method of claim 11 wherein the communication channel comprises a bi-directional parallel port in the development system.

13. The computer-implemented method of claim 11 wherein the communication channel comprises a serial port in the development system.

14. The computer-implemented method of claim 11 further comprising step of:

saving the contents of registers in the development system on the host computer via the communication channel.

15. The computer-implemented method of claim 14 further comprising step of:

restoring the contents of the registers in the development system from the host computer to the development system via the communication channel.

16. The computer-implemented method of claim 11 further comprising steps of:

receiving a debug command for processing by the processor in accordance with instructions in the debug program, wherein the debug command is received from the host computer via the communications channel.

17. The computer-implemented method of claim 16 further comprising steps of:

executing the debug command on the processor in accordance with instructions in the debug program.

18. The computer-implemented method of claim 17 further comprising steps of:

sending information associated with the development system to the host computer from the development system via the communication channel in response to execution of the debug command.

19. In a development computing system having a processor and a memory with an interrupt-handling portion, a computer-implemented method for debugging the development system, the method comprising the steps of:

receiving a debug command from a host computer via a communications channel;

directing the debug command to a debug program located in the interrupt-handling portion of memory;

executing the debug command on the processor in accordance with instructions in the debug program; and sending information associated with the development system to the host computer from the development system via the communication channel in response to execution of the debug command.

20. The computer-implemented method of claim 19 further comprising the steps of:

saving the contents of registers in the development system on the host computer via the communication channel; and restoring the contents of the registers in the development system from the host computer to the development system via the communication channel.

21. A system for debugging a development computing system, the system comprising:

a processor in the development system, for executing program instructions;

a communication channel, coupled to the processor, for sending and receiving data;

a host computer, communicatively coupled to the processor via the communication channel; and memory in the development system, coupled to the processor, for storing instructions for execution by the processor, wherein the memory comprises an interrupt-handling module of program instructions executable on the processor for handling interrupts issued by the development system, and wherein the interrupt-handling module of memory further comprises a debug module of program instructions executable on the processor for receiving interrupt information and for sending such information to the host computer via the communication channel.

22. The system of claim 21 wherein the communication channel comprises a bi-directional parallel port in the development system.

23. The system of claim 21 wherein the communication channel comprises a serial port in the development system.

24. The system of claim 21 wherein the host computer comprises debug software, and the host computer sends a debug command to the development system via the communication channel.

25. The system of claim 24 wherein the processor in the development system executes the debug command on the processor according to program instructions in the debug module of memory.

26. The system in claim 25 wherein data associated with the development system is sent to the host computer via the communication channel in response to the execution of the debug command.

27. The system in claim 21 wherein the memory comprises read only memory (ROM).

28. The system of claim 21 wherein the interrupt-handling module comprises a basic input/output system (BIOS).

29. The system of claim 21 wherein the interrupt-handling module is in a ROM BIOS computer chip.

30. The system of claim 21 wherein the development system further comprises at least one register having contents that are saved on the host computer via the communication channel according to program instructions in the debug module.

31. The system of claim 30 wherein the contents of said register are restored to the development system from the host computer via the communication channel according to the program instructions in the debug module.

32. The system of claim 21 wherein the interrupt-handling module comprises an entry module of program instructions executable on the processor for directing the interrupt information to the debug module.

33. The system of claim 21 wherein the interrupt information comprises a port 80 code.

34. The system of claim 21 wherein the interrupt information comprises a beep code.

* * * * *